(12) United States Patent
Linge et al.

(10) Patent No.: US 9,292,364 B1
(45) Date of Patent: Mar. 22, 2016

(54) PACKAGING APPLICATION DATA AND LOGIC FOR OFFLINE SUPPORT

(71) Applicants: Mario Linge, Mountain View, CA (US); Ananda Kumar Gajula, Cupertino, CA (US); Jianxun Zhou, Palo Alto, CA (US); Oscar Marquez, Hayward, CA (US); Xiaojun Feng, Mountain View, CA (US); Yang-cheng Fan, San Jose, CA (US); Ming Zhu, Cupertino, CA (US); Paul Xi, Sunnyvale, CA (US); Marco Eidinger, San Jose, CA (US); Mohamed Elzankaly, Fremont, CA (US)

(72) Inventors: Mario Linge, Mountain View, CA (US); Ananda Kumar Gajula, Cupertino, CA (US); Jianxun Zhou, Palo Alto, CA (US); Oscar Marquez, Hayward, CA (US); Xiaojun Feng, Mountain View, CA (US); Yang-cheng Fan, San Jose, CA (US); Ming Zhu, Cupertino, CA (US); Paul Xi, Sunnyvale, CA (US); Marco Eidinger, San Jose, CA (US); Mohamed Elzankaly, Fremont, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/494,457

(22) Filed: Sep. 23, 2014

(51) Int. Cl.
*G06F 13/00* (2006.01)
*G06F 9/54* (2006.01)

(52) U.S. Cl.
CPC .................................. *G06F 9/542* (2013.01)

(58) Field of Classification Search
CPC ................................ G06F 9/465; G06F 9/542
USPC ...................................................... 719/316, 318
See application file for complete search history.

(56) References Cited

U.S. PATENT DOCUMENTS

| 6,038,661 A * | 3/2000 | Yoshioka et al. ............. 712/244 |
| 7,996,493 B2 * | 8/2011 | Hill ............................... 709/218 |
| 2005/0114487 A1 * | 5/2005 | Peng et al. .................... 709/223 |
| 2015/0074686 A1 * | 3/2015 | Baeuerle et al. .............. 719/318 |

* cited by examiner

*Primary Examiner* — Andy Ho
(74) *Attorney, Agent, or Firm* — Fountainhead Law Group PC (57) ABSTRACT

A technique is described providing offline support to business applications. Offline support allows a business application running on a portable electronic device without connectivity to a backend server to operate as though the business application has access to a backend server. The technique receives a client request to operate the application in an offline mode. The technique then retrieves a business object to be utilized in the offline mode and an event trigger for interacting with the business object. The native programming language is then determined and then an event handler written in a native language of the client device and that is associated with the event trigger is retrieved. The event trigger is then modified to point to the event handler. The business object, event trigger, and event handler are then packaged together.

20 Claims, 11 Drawing Sheets

PACKAGING APPLICATION DATA AND LOGIC FOR OFFLINE SUPPORT

BACKGROUND

In today's fast-paced business environment, users frequently travel around to conduct business. For example, a sales representative can visit many customer locations throughout the day. Due to the nature of the business, there can be periods of time during the day where the user has limited or no internet connectivity, thereby resulting in an inability to access important data stored on backend servers. Even if the data is available, the sales representative still cannot interact with the data since the business logic is also stored on backend servers. This can result in lost productivity.

SUMMARY

In one embodiment, a computer-implemented method receives, by a processor, a client request to operate an application in an offline mode on a client device. The method then retrieves, by the processor, a business object from a business object repository, the business object containing application data to be utilized in the offline mode. The method then retrieves, by the processor, an event trigger for interacting with the business object, the event trigger pointing to a first event handler that is written in a first native programming language associated with the processor, the first event handler defining an action to perform on the business object. The method then determines, by the processor, a second native programming language of the client device. The method then retrieves, by the processor, a second event handler corresponding to the event trigger, the second event handler defining the action to perform on the business object, wherein the second event handler is written in the second native programming language. The method then modifies, by the processor, the event trigger to point to the second event handler instead of the first handler. Lastly, the method packages, by the processor, the business object, the event trigger, and the second event handler.

In one example, the client request can include an employee ID and wherein the business object and metadata are retrieved based on the employee ID.

In another example, the application operates in the offline mode on the client device when the client device is not in communication with the processor and wherein the application operates in an online mode on the client device when the client device is in communication with the processor.

In another example, retrieving the second event handler can include determining, by the processor, whether the second event handler exists in an event handler repository, generating, by the processor, the second event handler in response to the determination, and storing, by the processor, the second event handler in the event handler repository for future retrieval.

In another example, the method can further include retrieving, by the processor, a preference of a user account logged into the client device, the preference specifying an extension field that is active on the business object. The metadata and second event handler can be retrieved according to the extension field.

In another example, the method can further include determining, by the processor, a time frame in which the application is scheduled to operate in the offline mode on the client device and retrieving, by the processor, the business object, metadata, and second event handler according to the time frame.

In another embodiment, a non-transitory computer readable storage medium stores one or more programs comprising instructions for receiving a client request to operate an application in an offline mode on a client device, retrieving a business object from a business object repository, the business object containing application data to be utilized in the offline mode, retrieving an event trigger for interacting with the business object, the event trigger pointing to a first event handler that is written in a first native programming language associated with the processor, the first event handler defining an action to perform on the business object, determining a second native programming language of the client device, retrieving a second event handler corresponding to the event trigger, the second event handler defining the action to perform on the business object, wherein the second event handler is written in the second native programming language, modifying the event trigger to point to the second event handler instead of the first handler, and packaging the business object, the event trigger, and the second event handler.

In another embodiment, a computer implemented system comprises one or more computer processors and a non-transitory computer-readable storage medium. The non-transitory computer-readable storage medium comprises instructions, that when executed, control the one or more computer processors to be configured for receiving a client request to operate an application in an offline mode on a client device, retrieving a business object from a business object repository, the business object containing application data to be utilized in the offline mode, retrieving an event trigger for interacting with the business object, the event trigger pointing to a first event handler that is written in a first native programming language associated with the processor, the first event handler defining an action to perform on the business object, determining a second native programming language of the client device, retrieving a second event handler corresponding to the event trigger, the second event handler defining the action to perform on the business object, wherein the second event handler is written in the second native programming language, modifying the event trigger to point to the second event handler instead of the first handler, and packaging the business object, the event trigger, and the second event handler.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various embodiments herein describe a system for providing offline support to a business application. The business application, which includes application data and application logic, can be located on a backend server. A client device running a client program can utilize the application in one of two modes. In an online mode, the client program can transmit instructions to the backend server. The backend server processes the instructions and responds by transmitting the results back to the client device. Processing the instructions can include data queries and application logic. In an offline mode, the client program is not in communication with the backend server. The client device can be not in communication with the backend server for a variety of reasons. As a result, application data and/or application logic can be downloaded to the client device. This allows the client program to access relevant application data and application logic that typically is stored on the backend server during period of time in which the client device is unable to communicate with the backend server. Typically, the application data and application logic is downloaded to the client device while the application is operating in an online mode. The content that is downloaded to the portable electronic device can vary depending on implementation.

Figure 1:
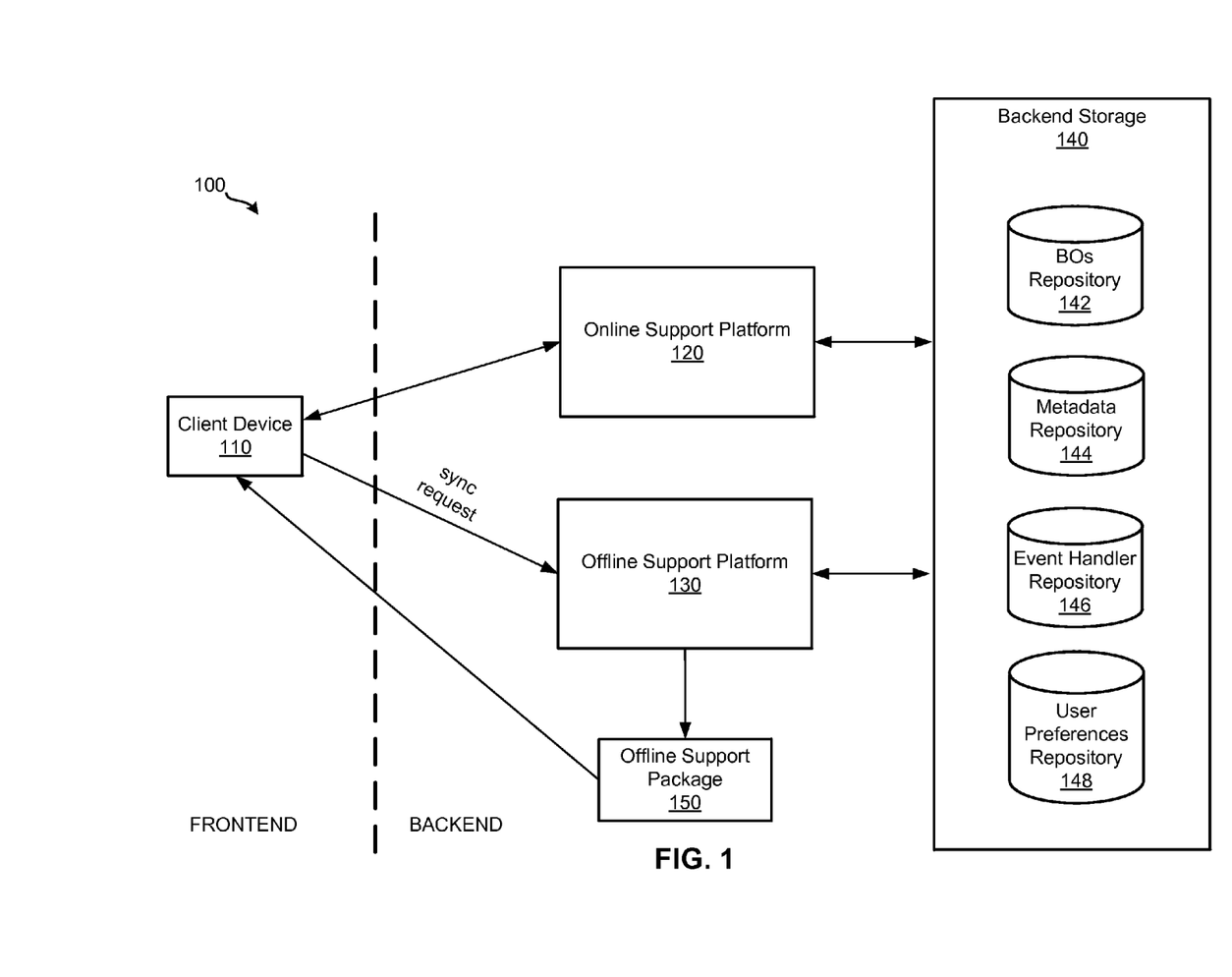
FIG. 1 illustrates a system according to one embodiment.

FIG. 1 illustrates system 100 according to one embodiment. System 100 has frontend portion that includes client device 110 and a backend portion that includes online support platform 120, offline support platform 130, and backend storage 140. Together, online support platform 120, offline support platform 130, and backend storage 140 make up the business application. A user operating client device 110 can interact with the business application in one of two modes. In an online mode, client device 110 transmits instructions to online support platform 120. Online support platform 120 can subsequently process the instructions based on application data and application logic stored in backend storage 140. The results of the processing can be transmitted back to client device 110 where the results can be presented to the user.

Backend storage 140 includes business object (BOs) repository 142, metadata repository 144, event handler repository 146, and user preferences repository 148. BOs repository 142 can store application data in the form of business objects. Each business object can store a set of attributes that describe the business object. Each business object can also store a set of associations with other business objects to represent the relationships between business objects. Metadata repository 144 can store metadata describing how business objects are presented to a user. This can include how business objects are presented on a display, the attributes which are presented, and the styling that is applied to the presentation. In some examples, the metadata can also activate an extension field on a business object. Extension fields can be optional fields on the business object that can be activated for certain customers. When activated, the extension field can be made available to the user. An exemplary extension field can be a marketing attribute field on the business object. Event handler repository 146 can store event handlers that describe the application logic. Each event handler can be associated with a business object and describe how attributes of the business object are analyzed or manipulated. User preferences repository 148 can store user preferences. User preferences can include the permissions of a user to access application data or permissions of a user to modify or manipulate the application data.

In an offline mode, client device 110 is not in communication with the backend and thus cannot access the business application by using online support platform 120. To address this, client device 110 can download parts of the business application (including application data and application logic) from backend storage 140. Once the application data and application logic have been downloaded, client device 110 can process instructions locally by utilizing the local copies of the application data and application logic without accessing backend storage 140. In some embodiments, offline support platform 130 can collect application data and application logic from backend storage 140 to generate offline support package 150, which in turn is transmitted to client device 110. Client device 110 can utilize the offline support package to operate the business application in the offline mode. In one embodiment, client device 110 can transmit a sync request to offline support platform 130. The sync request can be a communication to synchronize a local version of the business application stored on client device 110 with the backend portion. In on example, the sync request can be transmitted after local changes to the application data that were made while the client device was operating in the offline mode are synced with BOs repository 142. Offline support platform 130 can process the sync request and generate offline support package 150. Offline support package 150 can then be transmitted to client device 110. The processing of the sync request is typically performed while the business application is operating in an online mode.

Figure 2:
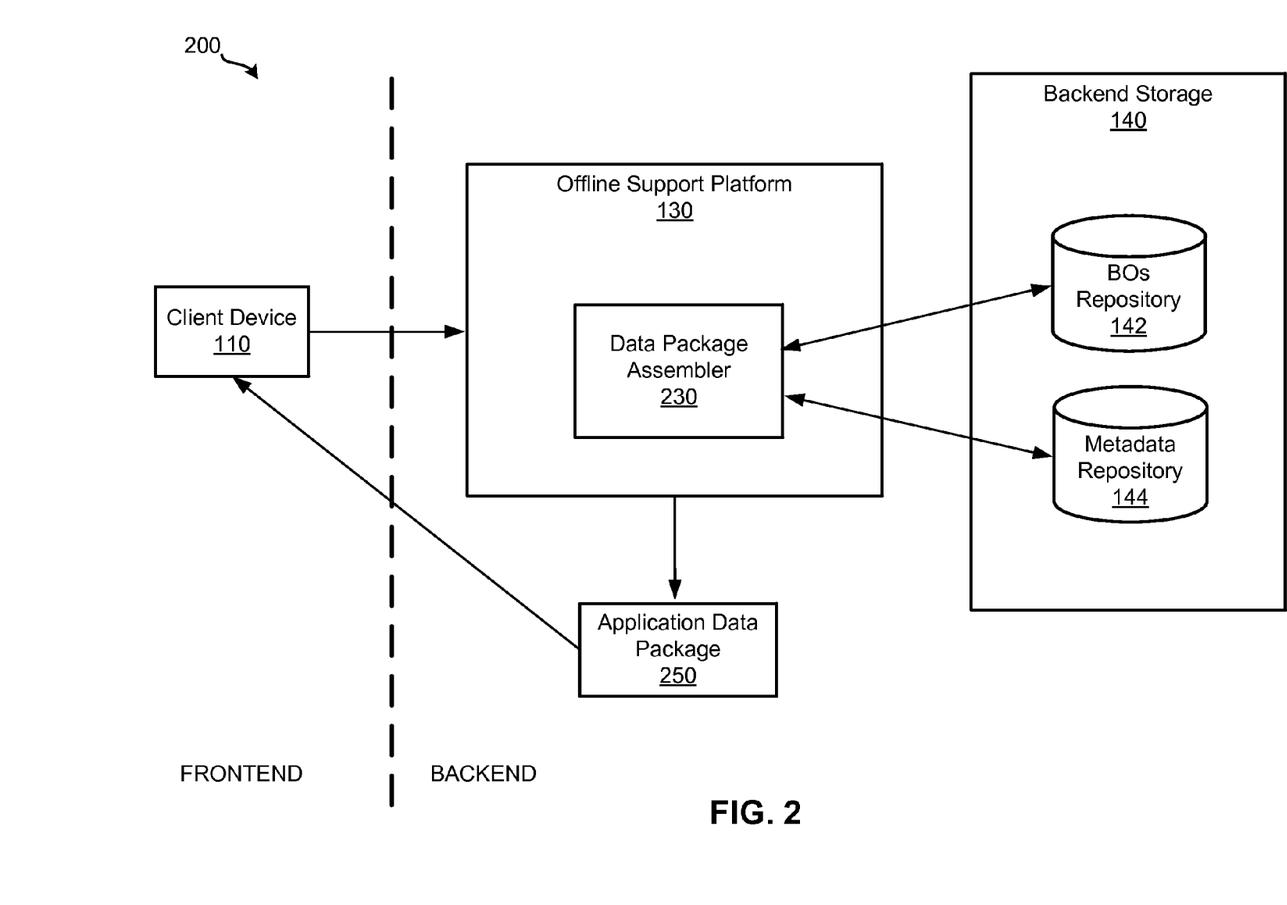
FIG. 2 illustrates a system according to one embodiment.

FIG. 2 illustrates system 200 according to one embodiment. System 200 is configured to generate application data package 250 from application data stored in backend storage 140. The contents of application data package 250 can be based on the client request and/or settings of the user. The settings of the user can be predefined. System 300 includes client device 110, offline support platform 130, and backend storage 140. Data package assembler 230 of offline support platform 130 receives a data request from client device 110 and processes the data request by retrieving application data from backend storage 140. The application data can include business objects from BOs repository 142 and metadata from metadata repository 144. Data package assembler 230 can package the retrieved application data as application data package 250 and subsequently transmit application data package 250 to client device 110. In one embodiment, client device 110 can request to download the application data separately from the application logic. In another embodiment, client device 110 can request to download the application data along with the application logic.

Figure 3:
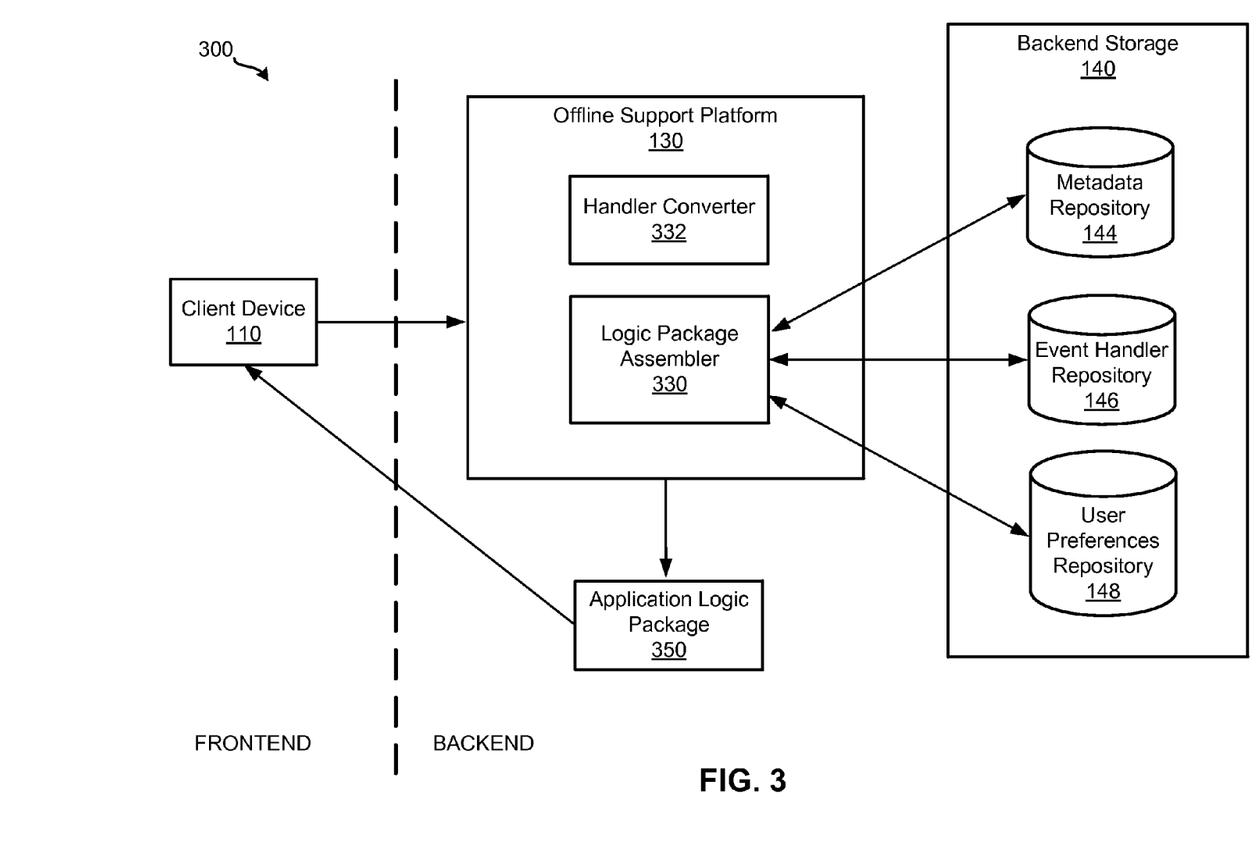
FIG. 3 illustrates a system according to one embodiment.

FIG. 3 illustrates system 300 according to one embodiment. System 300 includes client device 110, offline support platform 130, and backend storage 140. System 300 is configured to generate application logic package 350 from application logic stored in backend storage 140. In the initial state, client device 110 transmits a client request for application logic to offline support platform 130. The client request can specify the types of event handlers to include in application logic package 350. This can include specifying the business objects which are to be supported in the offline mode. Alternatively, user preferences in user preferences repository 148 can specify one or more of the event handlers to include in application logic package 350.

Offline support platform 130 includes logic package assembler 330 and handler converter 332. Logic package assembler 330 is configured to communicate with backend storage 140 to collect application logic to generate application logic package 350. In one embodiment, logic package assembler 330 can retrieve metadata from metadata repository 144 and user preferences from user preferences repository 148. The retrieved information, in combination with the client request, can be analyzed by logic package assembler 330 to select event handlers to include in application logic package 350. In one example, the client request can specify a client ID. Logic package assembler 330 can retrieve metadata and user preferences based on the client ID. Subsequently, logic package assembler 330 can analyze the retrieved metadata and user preferences to select event handlers from event handler repository 146 to include in application logic package 350. The selected event handlers can be retrieved and packaged into application logic package 350.

In some embodiments, the metadata can include an event trigger for interacting with a business object. When the business object or an attribute of the business object is selected in the presentation, the event trigger is triggered and an event handler that is linked to the event trigger is executed. Executing the event handler would perform the action that is linked to the event trigger.

In some embodiments the programming language of online support platform 120 can be different than the programming language of client device 110. Therefore, an event handler created to run in online support platform may not be able to run on client device 110. To remedy this, language-specific event handlers can included in event handler repository 146. Event handler repository 146 can include a first version of an event handler that is configured for processing by online support platform 120 and a second version of the event handler that is configured for processing by client device 110. If client devices running on different programming languages are supported (e.g., IOS, Android, HTML 5, etc.), then additional versions of the event handler can be stored in event handler repository. Depending on the environment in which the event handler will be running, a corresponding version of the event handler can be retrieved by logic package assembler 330 to be packaged in application logic package 350. In some embodiments, handler converter 332 can convert a first version of an event handler into a second version of the event handler.

In some embodiments, offline support platform 130 can combine application data package 250 and application logic package 350 into a single package before transmitting the package to the client device.

Figure 4:
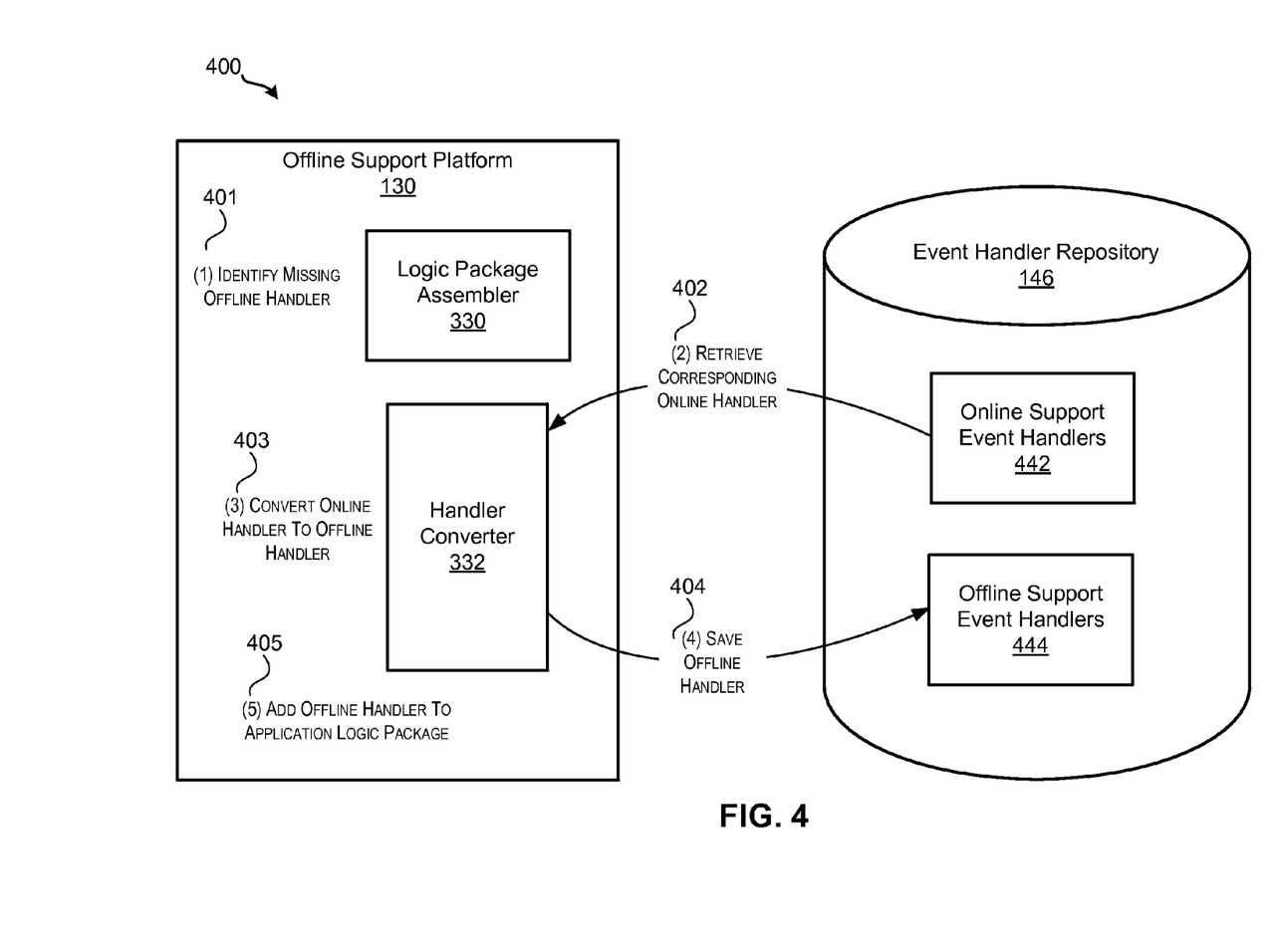
FIG. 4 illustrates a workflow for generating a version of an event handler according to one embodiment

FIG. 4 illustrates workflow 400 for generating a version of an event handler according to one embodiment. Workflow 400 is configured to generate an event handler for offline support when one is missing. Workflow 400 includes offline support platform 130, which includes logic package assembler 330 and handler converter 332. Offline support platform 130 is in communication with event handler repository 146, which includes online support event handlers 442 and offline support event handlers 444. Online support event handlers 442 includes event handlers which are configured for use while the business application is in the online mode (i.e., running through online support platform 120). This is one version of the event handlers. Offline support event handlers 442 includes event handlers which are configured for use while the business application is in the offline mode (i.e., running using application data and application logic stored locally on client device 110). This can be one or more additional versions of the event handlers in online support event handlers 442. If offline support platform 130 supports multiple client devices operating off of multiple programming languages, then offline support event handlers 444 can include multiple versions of the event handlers.

Workflow 400 can begin at step (1) (reference numeral 401) by identifying a missing offline event handler. Logic package assembler 330 can identify the missing offline event handler while querying offline support handlers 444 for a desired version of an event handler. If the desired version is unavailable or missing, logic package assembler 330 can identify the desired version of the event handler as missing.

Once the missing offline event handler has been identified, workflow 400 can continue with handler converter 332 retrieving an online version of the desired event handler from online support event handlers 442 at step (2) (reference numeral 402). At step (3) (reference numeral 403), handler converter 332 can convert the retrieved online version of the desired event handler into the desired version of the event handler. This can include converting the syntax and logic from a programming language that is used in the online mode to the programming language that is used by the client device.

Once the event handler has been converted to the desired version of the event handler (which is also known as generating the desired version of the event handler), workflow 400 can continue with handler converter 332 saving the desired version of the event handler in offline support event handlers 444. By saving the event handler in the event handler repository 146, the event handler can be available for use in subsequent requests to generate an application logic package. At step (5) (reference numeral 405), the desired version of the event handler is added to application logic package 350.

In some embodiments, the metadata retrieved by logic package assembler 330 can include event triggers. An event trigger can be associated with a business object or an attribute of the business object and can be linked to an event handler. When the event trigger is triggered, the linked event handler is executed. While generating application logic package 350, logic package assembler 330 can modify the triggering event of the metadata to link to a version of the event handler which can be executed by the client device. The resulting application logic package 350 can include metadata describing how business logic is to be presented in a presentation. The metadata can include event triggers which describe ways in which a user can interact with the presentation. Each event trigger can be linked to an event handler. When the event trigger is triggered, the corresponding event handler is executed. The corresponding event handlers can also be included in application logic package 350.

Figure 5:
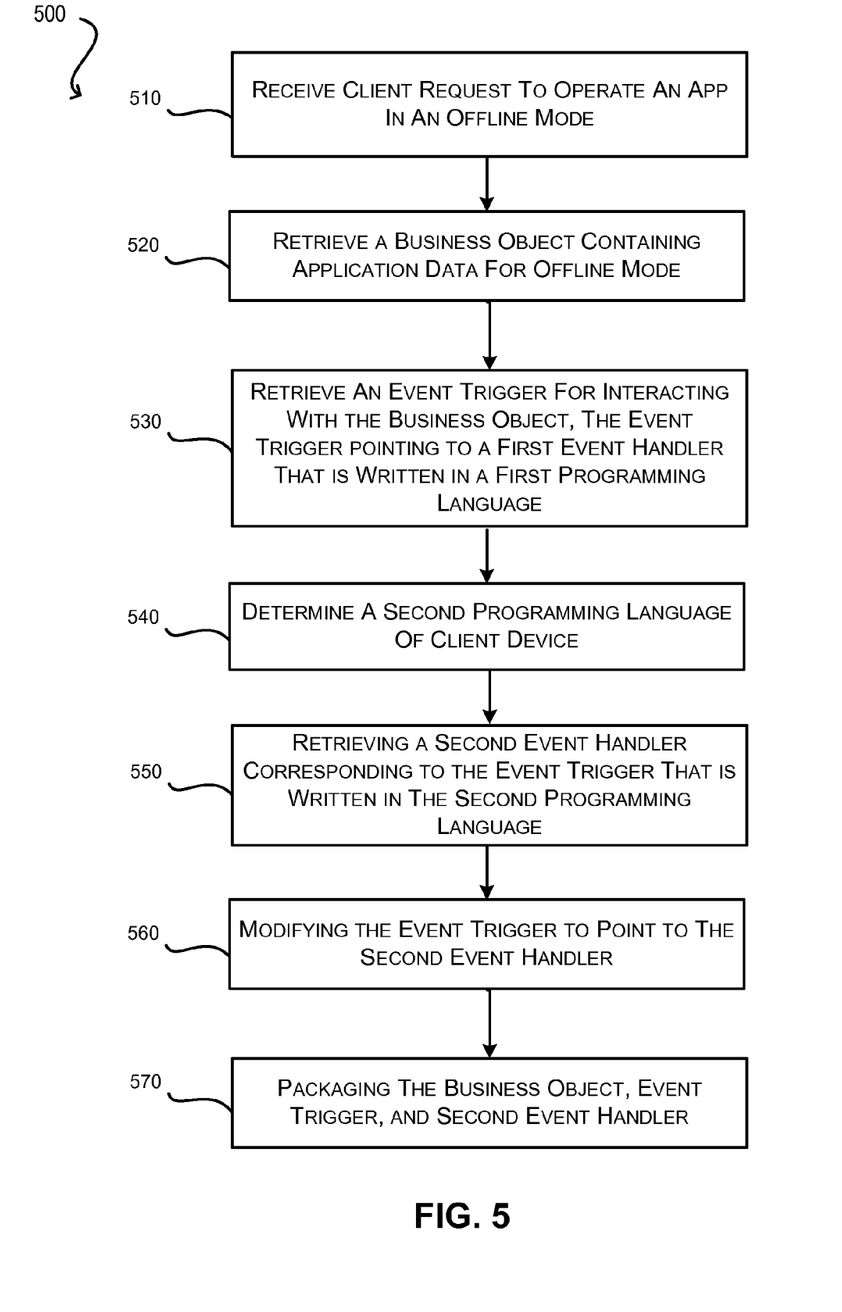
FIG. 5 illustrates a process flow for packaging application logic according to one embodiment.

FIG. 5 illustrates a process flow for packaging application logic according to one embodiment. Process 500 can be stored in computer readable medium and executed by a processor. In one embodiment, the processor can belong to offline support platform 130 of FIG. 1. Process 500 begins by receiving a client request to operate an application in an offline mode at 510. The client request can be received from a client device. Once the client request has been received, process 500 can retrieve a business object containing application data for use in the offline mode at 520.

Once the business object has been retrieved, process 500 can continue by retrieving an event trigger for interacting with the business object. The event trigger can be retrieved from metadata repository 144. The event trigger can point to a first event handler that is written in a first programming language.

In one example, the first programming language can be the native language of the online support platform. In some examples, the event trigger can be part of a metadata file that defines a presentation of the business object.

Once the event trigger has been retrieved, process 500 can determine a second programming language that is the native programming language of the client device at 540. The native programming language of the client device may be different than the native programming language that is used by online support platform 120. The native language of the client device can be determined from a client device ID received from the client request. For example, the native language can be found in a look up table according to the client device ID.

Once the second programming language has been determined, process 500 can retrieve a second event handler corresponding to the event trigger that is written in the second programming language at 550. The second event handler can be a different version of the first event handler. In one embodiment, the second event handler can be retrieved from event handler repository 146. In the situation where the second event handler does not exist in event handler repository 146, retrieving the second event handler can include determining whether the second event handler exists in the event handler repository, generating the second event handler from the first event handler in response to the determination, and storing the second event handler in the event handler repository for future retrieval.

After retrieving the second event handler, process 500 continues by modifying the event trigger to point to the second event handler. This allows the event handler to properly execute on the client device when the event trigger is triggered. Lastly, process 500 can package the business object, event trigger, and second event handler into an offline support package which can be transmitted to the client device.

Figure 6:
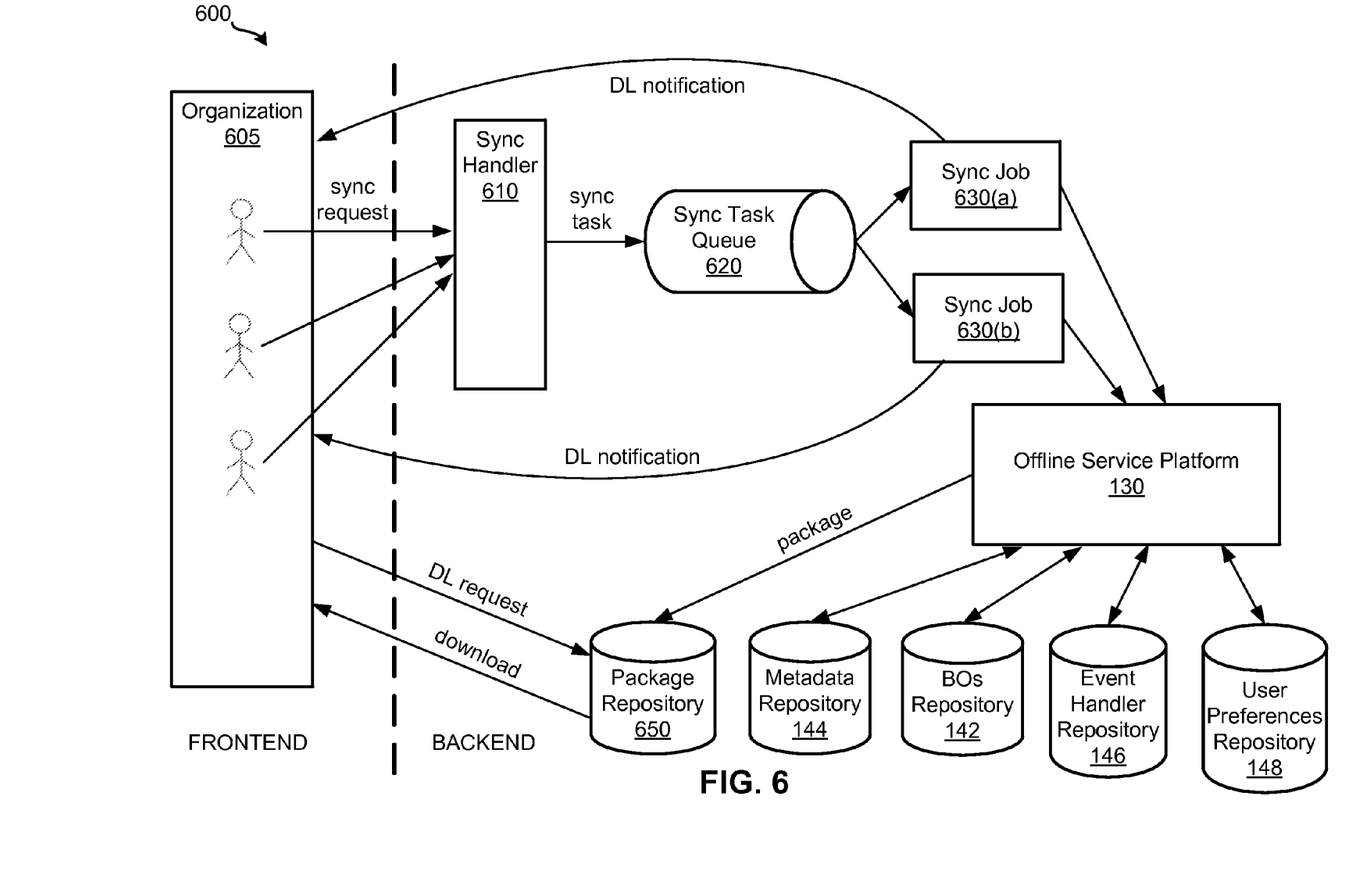
FIG. 6 illustrates a system according to one embodiment.

FIG. 6 illustrates system 600 according to one embodiment. System 600 includes multiple components on the backend that together provide offline support to users in an organization. System 600 includes organization 605 which consists of multiple users. Each user can be an employee of the organization that desires offline support for a business application. The users of organization 605 and the electronic devices they use to communicate with the backend are considered part of the front end. Sync requests are transmitted from users (more specifically client devices) in the frontend to the backend for processing. For example, a portable electronic device of the user can transmit a sync request to the backend. Once the sync request is transmitted, the portable electronic device can terminate the connection with the backend and continue with other operations. Once the backend has fulfilled the request by generating a package of the desired content, the portable electronic device can receive a notification from the backend that the package is ready. In response to receiving the notification, the portable electronic device can reestablish communication with the backend to download the package.

The backend of system 600 includes sync handler 610. Sync handler 610 is configured to generate a sync task for each sync request received. The sync task can include parameters that specify the contents of the package to be generated. In one embodiment, sync handler 610 can retrieve the parameter from the sync request. In another embodiment, sync handler 610 can communicate with an employee database (not shown) to retrieve a predefined parameter. Sync handler 610 can use the parameters to define the sync task.

System 600 further includes sync task queue 620. Sync task queue 620 receives sync tasks and creates a sync job for each sync task output from sync task queue 620. In some embodiments, sync tasks can output sync task queue 620 when system resources become available. In one example, the resources of system 600 may be capable of processing a predefined number of sync jobs at the same time in parallel. In another example, sync task queue 620 can monitor the resources of system 600 and create new sync jobs depending on available resources. In one embodiment, sync task queue 620 can output sync tasks using a first in, first out algorithm. In another embodiment, sync task queue 620 can analyze the sync tasks and rearrange the sync tasks in the queue based on different methodologies. For example, sync tasks that require less time to perform may move up the queue in front of sync tasks that require more time to perform. The period of time required to perform a sync task can be determined by a variety of factors, including whether a package already exists in package repository 650 for the user associated with the sync task (since generating a package containing the delta of changes since the last package can contain less content), the amount of content requested (based on time frame or services requested), or user priority (e.g., perform sync tasks from executives before sync tasks from staff). As shown here, sync task queue 620 can generate sync jobs 630(*a*) and 630(*b*).

Sync job 630 is configured to generate a package from content stored in metadata repository 144 and BOs repository 142. In some embodiments, offline service platform 130 can provide algorithms that are used by sync job 630 to collect content from various data sources and to generate the package. Offline service platform 130 can contain an algorithm that defines how the package is generated for each service, product, and application being handled by system 600. The algorithm can also specify that the generated package is stored in package repository 650. In one embodiment, offline service platform 130 can support plugin mechanisms that allow backend developers to implement new offline objects or algorithms.

When sync job 630 finishes generating a package for a sync task, sync job 630 transmits a download notification back to the portable electronic device that belongs to the user that corresponds with the sync task, thereby notifying the user that the package is ready. The user who receives the download notification can re-establish communication with the backend and transmit a download request to retrieve the package. Advantages to re-establishing communication with the backend when the package is ready rather than maintaining an active communication channel during the creation of the package can include reducing bandwidth usage of system 600, freeing up resources on user devices to perform other tasks on the user device, and preventing timeouts on the user device as the device waits to receive the content. In one embodiment, the download notification can contain a unique identifier which the user transmits back to retrieve the desired package. The package is then transmitted from package repository 650 to the user. In other embodiments, the components of system 600 can be interconnected in a different orientation.

Figure 7:
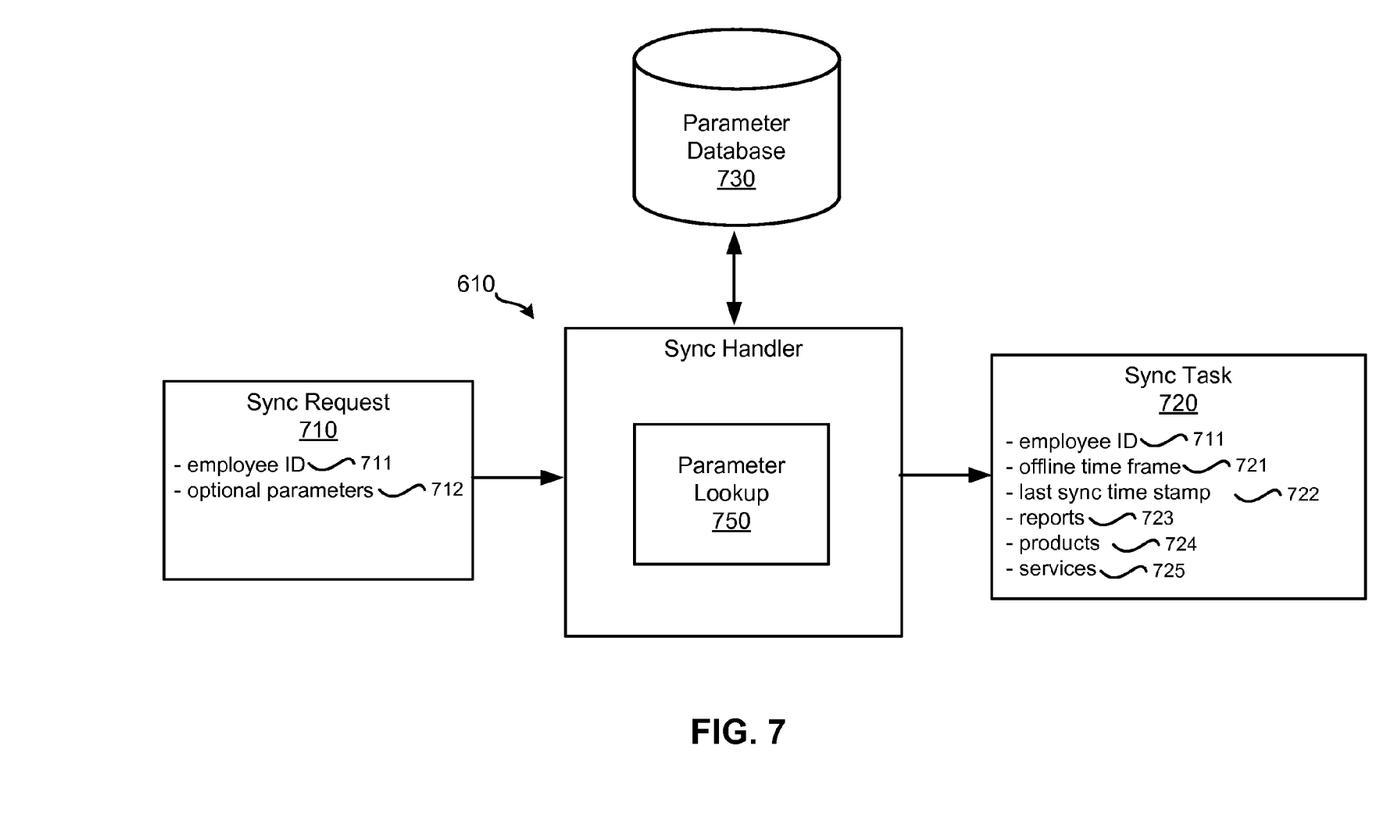
FIG. 7 illustrates an example of a sync handler according to one embodiment.

FIG. 7 illustrates an example of sync handler 610 according to one embodiment. Sync handler 610 is configured to generate sync task 720 after receiving sync request 710. Sync request 710 can include one or more parameters that are used by sync handler 610 to generate sync task 720. Some of the parameters can be required while others can be optional. In one embodiment, an employee ID 711 can be a required parameter in sync request 710. Employee ID 711 can uniquely identify the user of organization 605 who is submitting the sync request. This information not only allows sync handler 610 to determine additional parameters for the user, but also allows system 600 to identify the owner of the package when the package is generated. Sync request 710 can also include one or more optional parameters 712, some of which are described below. Optional parameters 712, when included in sync request 710, can override predefined parameters that are associated with employee ID 711.

Sync handler 610 includes parameter lookup 750. Parameter lookup 750 is configured to retrieve predefined parameters from parameter database 730. Parameter database 730 can store one or more parameters for each user. The parameters can define a configuration for a particular user. For example, the configuration can specify that the products, services, tools, or applications that the user is using. As another example, the configuration can specify the preferences of the user when operating in offline mode. For instance, a user can by default request to download content that may be accessed by a user application the week before and the week after (two week time frame). In one embodiment, parameter lookup 750 can retrieve the predefined parameters according to employee ID 711. Sync handler 610 can in turn use the retrieved parameters along with the optional parameters 712 to generate sync task 720.

Sync task 720 can include a list of parameters. Some of the parameters can be from sync request 710 while other parameters (e.g., predefined parameters) can be from parameter database 730. In one embodiment, sync handler 610 can give precedence to parameters provided from sync request 710 over predefined parameters having the same name provided from parameter database 730. In other words, optional parameters 712 in sync request 710 can override predefined parameters in parameter database 730 when sync task 720 is generated. For example, a first setting for an offline-time frame parameter that is part of optional parameters 712 can be used over a second setting for a parameter having the same name from parameter database 730.

The predefined parameters from parameter database 730 which can form part of sync task 720 include offline time frame 721. Offline time frame 711 defines a period of time in which the user expects to use the portable electronic device in an offline mode. By setting offline time frame 211, content that is relevant to user during that time frame (or content that the user may access during the time frame) can be identified as content to include in the package.

Parameter database 730 can also include last sync time stamp 722. Last sync time stamp 722 defines the time when the last sync request was performed for the user. In one example, this can be the time when the last package was generated for the user. By providing last sync time stamp 722 in sync task 720, the sync job can focus on packaging content which has changed since the last update when processing sync task 720. In one embodiment, content which matches the search criteria but was provided in the last sync can be skipped. This can avoid the redundant transmission of content that has previously be delivered to the user, thus resulting in a smaller package. Smaller packages can reduce storage space used in package repository 650 and can reduce bandwidth usage when the package is delivered to the user.

Parameter database 730 can also include reports 723, products 724, and services 725. These parameters can be used to specify the reports, products, and services (respectively) that the user would like to sync. In one embodiment, reports, products, and services provided as optional parameters 712 in sync request 710 can be combined with reports, products, and services provided in parameter database 730. In another embodiment, reports, products, or services in parameter database 230 can be skipped when they are provided optional parameters 712 of sync request 710.

Figure 8:
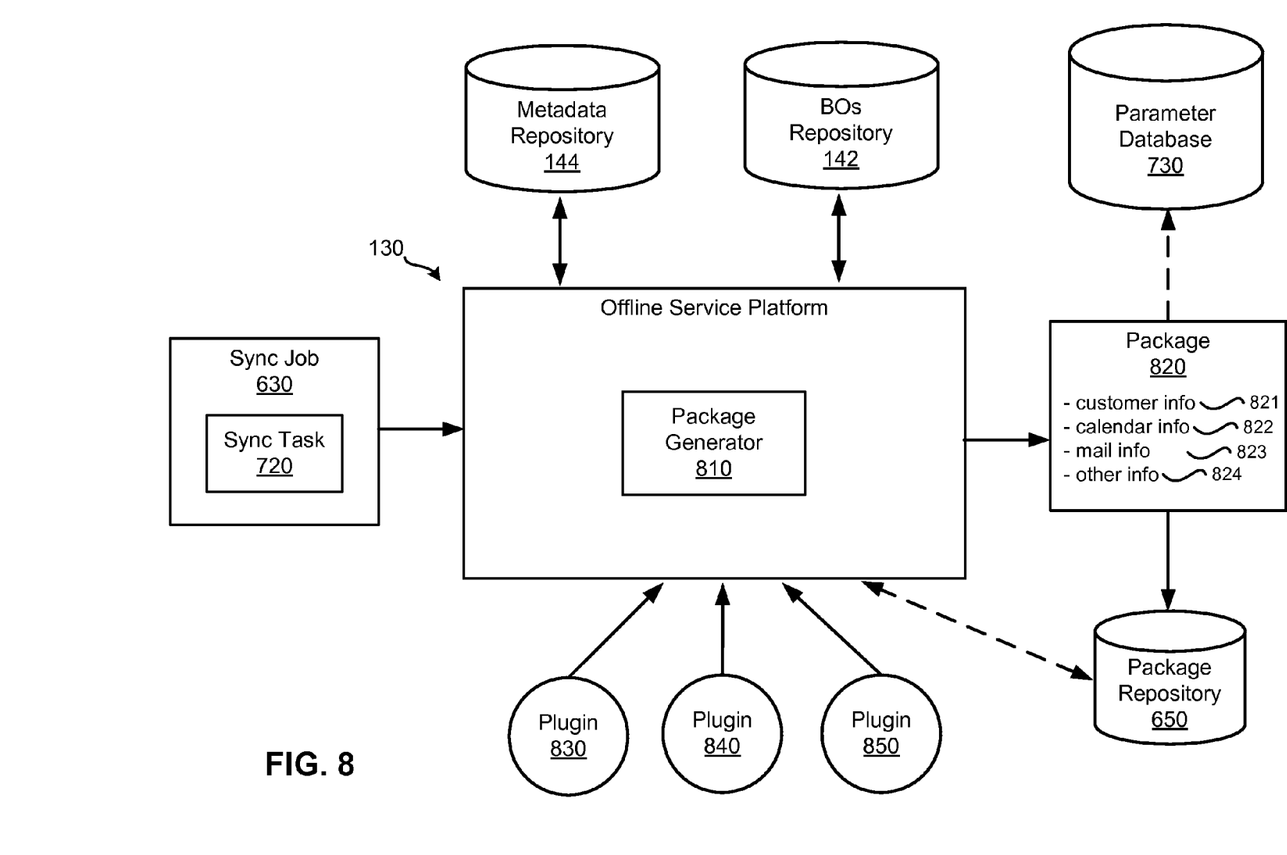
FIG. 8 illustrates an example of offline service platform according to one embodiment.

FIG. 8 illustrates an example of offline service platform 130 according to one embodiment. Offline service platform 130 is configured to provide the logic that is used by sync job 630 when processing sync task 720. Offline service platform 130 includes package generator 810. Package generator 810 selects the logic according to the parameters in sync task 720. In one embodiment, package generator 810 can select a plugin from plugins 830, 840, and 850 to apply in sync job 630 based on a report, package, or service listed in sync task 720. For example, package generator 810 can select plugin 830 when a calendar service is specified in sync task 720. In some examples, additional plugins can be implemented by backend developers and offered through offline service platform 640. Sync job 630 can generate package 820 according to the logic provided by selected plugins. The generation of package 820 can include content retrieval from metadata repository 144 and BOs repository 142.

Package 820 can include content that would allow the user to operate the user's electronic device in an offline mode. In one embodiment, package 820 can include customer info 821. Customer info 821 is customer metadata that may be accessed by the user while the user's device is in the offline mode. For example, customer contact information, customer addresses, customer sales information, and other customer related information can be included in package 820. Package 820 further includes calendar info 822. Calendar info 822 is calendar metadata that may be access by the user while the user's device is in the offline mode. For example, meeting information and task information can be included in package 820. Package 820 further includes mail info 823. Mail info 823 is content from a mail application that may be accessed by the user while the user's device is in the offline mode. For example, the user's mail for the past two weeks can be included in the package. Other info 824 that can be useful to the user while operating the user device in an offline mode can also be included.

In some embodiments, the content that is included in package 820 can be confined by parameters in sync task 720. In one embodiment, sync job 630 can confine the content in package 820 according to restrictive parameters provided in sync task 720. For example, offline time frame 721 can specify that the user plans on being in an offline mode for a week. As a result, customer info 821 and calendar info 822 can be restricted to content that falls within the window of time specified by the time frame. Similarly, last sync time stamp 722 can specify the time that the last package was generated. Thus, content for customer info 821, calendar info 822, and mail info 823 having a last modified time stamp that is older than the last sync time stamp 722 was previously delivered in the previous package. The logic may generate a current package that skips previously delivered content, thereby minimizing the amount of repetitive content that is transmitted to the user device. Once package 820 has been generated, package 820 can be stored in package repository 650.

In one embodiment, offline service platform 130 can optionally retrieve package information from package repository 650 to identify what has already been included in a previously delivered package. This can allow information that has been previously delivered to a user to not be included in a currently generated package to the same user. As a result, the delta changes since the last delivered package will be provided in the current package. In another embodiment, generated package 820 can optionally be used to refine parameter database 730. For example, offline time frame 721, last sync time stamp 722, and other parameters can be updated upon the generation of package 820.

Figure 9:
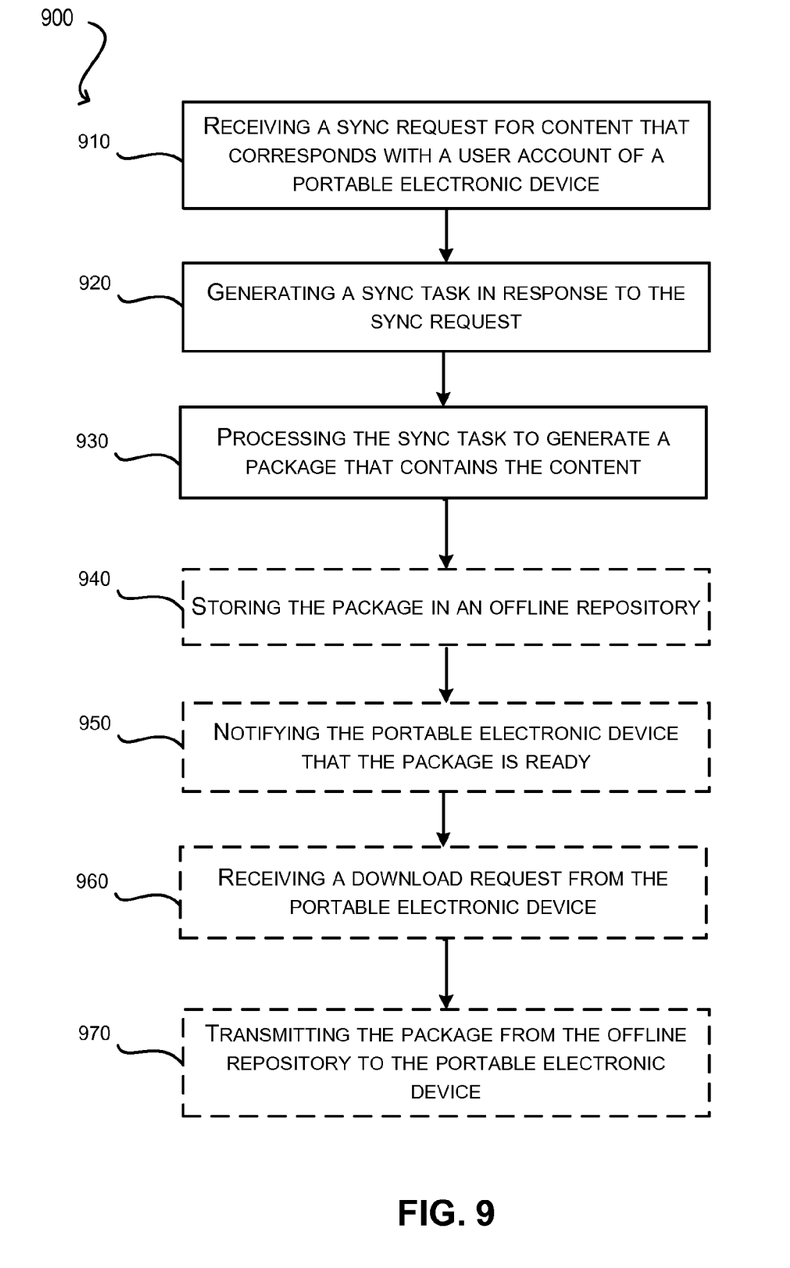
FIG. 9 illustrates a process flow for syncing content with a portable electronic device according to one embodiment.

FIG. 9 illustrates a process flow for syncing content with a portable electronic device according to one embodiment. Process 900 can be stored in computer readable medium and executed by a processor. In one embodiment, the processor can belong to a backend server in system 600 of FIG. 6. Process 900 begins by receiving a sync request for content that corresponds with a user account of a portable electronic device at 910. The content can be configured to allow a user to operate the portable electronic device in an offline mode where the portable electronic device is not in communication with the backend server. In one example, a user can instruct the portable electronic device to generate a sync request and transmit the sync request to the backend server. The sync request can include various parameters, some of which are required. For example, an employee ID that uniquely identifies the user can be required.

After receiving the sync request, process 900 continues by generating a sync task in response to the sync request. The sync task can be generated base on parameters provided in the sync request. In one embodiment, additional predefined parameters that are associated with the user account can be retrieved from a parameter database and used to generate the sync task. For example, generating the sync task can include identifying an employee ID from the sync request, retrieving a default parameter associated with the employee ID, and storing the retrieved default parameter as part of the sync task.

After generating the sync task, process 900 can continue by processing the sync task to generate a package that contains the content at 930. In one embodiment, a sync job can be created to process the sync task. The sync job can access one or more data sources to retrieve the content according to logic or algorithms specified by the sync task. In one example, processing the sync task can include identifying a service that is associated with the user account, retrieving a plugin that corresponds with the service, and processing the sync task with the plugin to generate the package. In another example, processing the sync task can include determining a last update time stamp associated with the user account, retrieving data associated with the user account having a time stamp more recent that the last update time stamp, and packaging the data into the package. The last update time stamp can be determined by identifying a previously generated package associated with the user account from an offline repository and retrieving the last update time stamp from the previously generated package. In yet another example, processing the sync task can include determining a time frame that the portable electronic device will be operating in the offline mode and retrieving the content according to the time frame. In yet other examples, a combination of these techniques can be applied when processing the sync task.

After processing the sync task, process 900 can optionally continue by storing the package in an offline repository at 940. In one embodiment, the offline repository can be configured to store one package for each user. When a new package is stored in offline repository, a previously generated package can be deleted. In another embodiment, the offline repository can be configured to store an original package for each user plus multiple additional packages which store the delta changes. Together, the original package and the additional packages can represent the entire package for the user. In yet another embodiment, the offline repository can be configured to store packages for a predefined period of time. For example, packages in the offline repository can be deleted once the package is over a week old.

Once the package has been stored, process 900 can optionally continue by notifying the portable electronic device that the package is ready at 950. The notification can be transmitted to the user as a push notification, email, or other form of notification. Sometime after notifying the portable electronic device, process 900 can optionally continue by receiving a download request from the portable electronic device. The download request can include the employee ID associated with the user account. The employee ID can be utilized to identify the package the deliver to the user.

Once the download request is received, process 900 can optionally continue by transmitting the package from the offline repository to the portable electronic device. In one embodiment, one or more packages can be transmitted to the portable electronic device.

Figure 10:
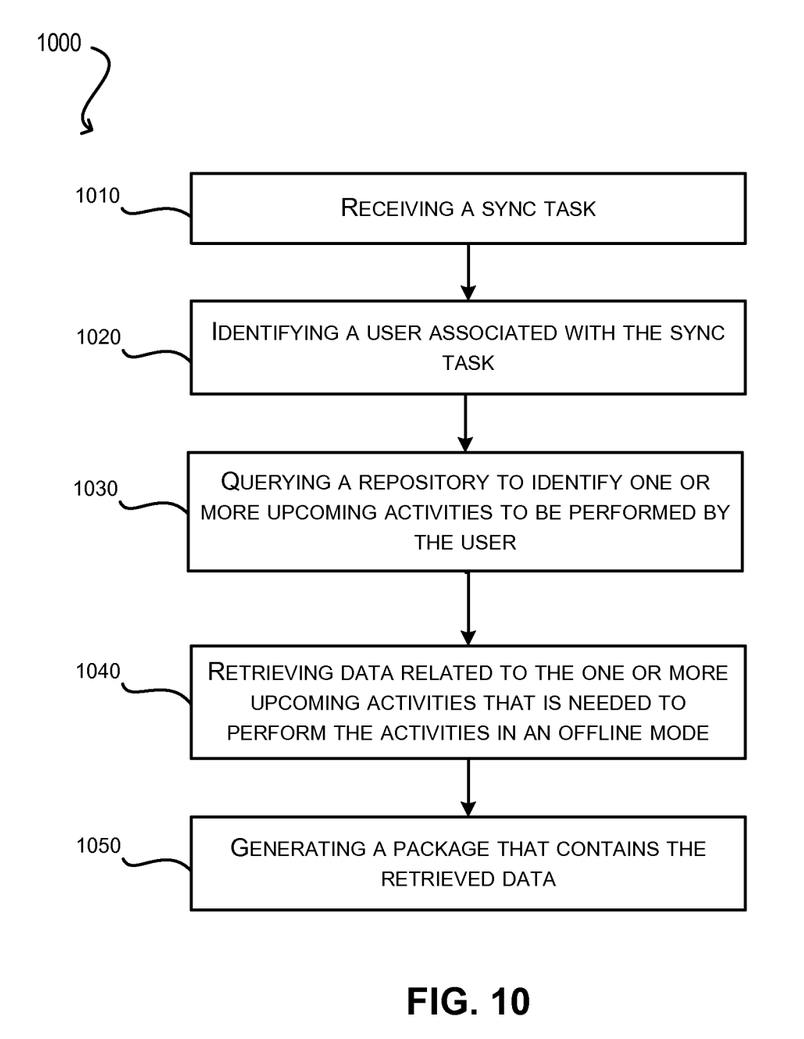
FIG. 10 illustrates a process flow for generating a package according to one embodiment.

FIG. 10 illustrates a process flow for generating a package according to one embodiment. Process 1000 can be stored in computer readable medium and executed by a processor. In one embodiment, the package generator 810 of FIG. 8 can perform the process flow to generate package 820. Process 1000 begins by receiving a sync task at 1010. Once the sync task is received, process 1000 can identify a user associated with the sync task at 1020. Identification of the user can be by an employee ID stored in the sync task. In other embodiments, the role of the user or the user ID can be identified by querying an employee database.

Once the user is identified (and optionally the user's role), process 1000 can continue by querying a repository to identify one or more upcoming activities to be performed by the user at 1030. In one embodiment, a query can be performed on a repository storing calendar data. Appointments and activities that are associated with the user and that fall within a predefined period of time can be retrieved. For example, the user's upcoming activities for the next week can be identified. In some examples, activities and appointments for a particular user role can also be identified. For example, process 1000 can identify upcoming activities that are associated for a particular type of user, such as a salesperson. For instance, weekly meetings or salesperson conferences can also be identified according to the user rule.

Once the upcoming activities have been identified, process 1000 can continue by retrieving data (e.g., business data and metadata) related to the upcoming activities at 1040. The data retrieved can be data that is needed to perform the activities in an offline mode. For example, customer contact information, customer surveys, and customer spreadsheets to perform tasks such as inventory and profits can be retrieved. Once the data has been retrieved, process 1000 can generate a package that contains the retrieved data at 1050.

In some embodiments, plugin 830, 840, or 850 can generate the data for the offline mode and offline service platform 130 can collect the data from the plugins to generate the package and persist the package into package repository 650. In one example, the package can be a zip file that includes business data files, metadata files, and timestamp files. Business data files can contain the content of business data. Metadata files can describe the business data metadata information. Timestamp files can contain the timestamp of the finishing time of the last sync task. The timestamp can be used to request for data that has changed since the timestamp. In one specific example, the package file can be called "offline.zip" and contain "account.data", "account.metadata", "contact.data", "contact.metadata", and "timestamp.txt" files.

In one specific example, a user may be an inventory checker who visits customers on a weekly basis. The user can submit a sync task which gets queued and eventually processed by package generator 810. Package generator 810 can identify the user associated with the sync task and identify activities associated with the salesperson. For example, package generator 810 can identify that the user is an inventory checker and that the user plans to operate in an offline mode for the next seven days. Package generator 810 can query a repository to identify four stores that the inventory checker has scheduled to visit over the next seven days and optionally the activities the inventory checker is to perform as each store. For instance at a first store which is a restaurant, the stock checker may be scheduled to conduct a survey and take new orders. At a second store which is a supermarket, the stock checker may be scheduled to take inventory. Once the activities have been identified, package generator 810 can retrieve data related to the upcoming activities that is needed to perform the activities in an offline mode. For instance, the survey form needed to conduct the survey, an order form needed to take new orders, and an inventory form needed to mark inventory can be retrieved. Package generator can generate a package that includes the retrieved data.

Figure 11:
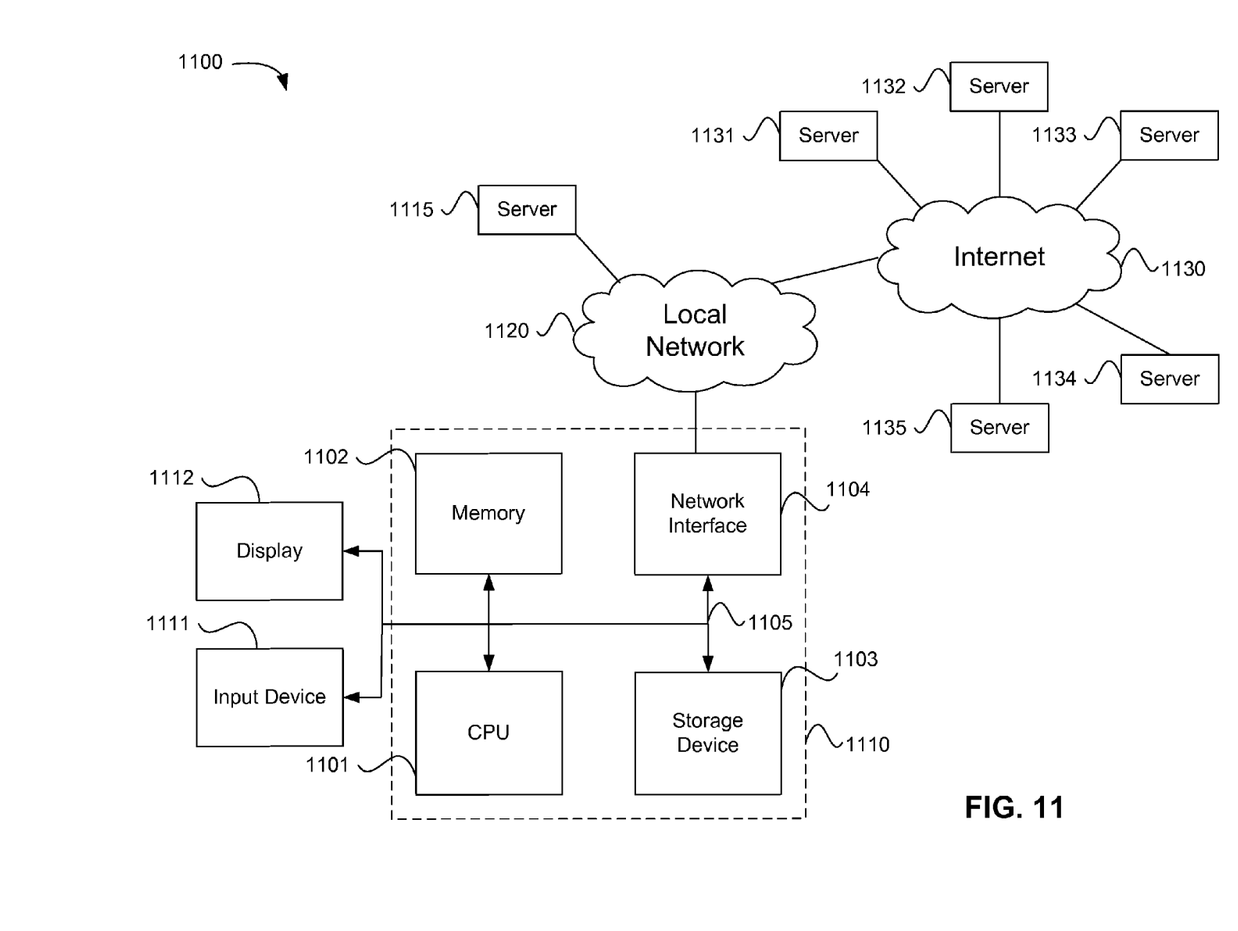
FIG. 11 illustrates an exemplary computer system according to one embodiment.

An exemplary computer system 1100 is illustrated in FIG. 11. Computer system 1110 includes bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable mediums.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
   receiving, by a processor, a client request to operate an application in an offline mode on a client device;
   retrieving, by the processor, a business object from a business object repository, the business object containing application data to be utilized in the offline mode;
   retrieving, by the processor, an event trigger for interacting with the business object, the event trigger pointing to a first event handler that is written in a first native programming language associated with the processor, the first event handler defining an action to perform on the business object;
   determining, by the processor, a second native programming language of the client device;
   retrieving, by the processor, a second event handler corresponding to the event trigger, the second event handler defining the action to perform on the business object, wherein the second event handler is written in the second native programming language;
   modifying, by the processor, the event trigger to point to the second event handler instead of the first event handler; and
   packaging, by the processor, the business object, the event trigger, and the second event handler.

2. The computer-implemented method of claim 1, wherein the client request includes an employee ID and wherein the business object and metadata are retrieved based on the employee ID.

3. The computer-implemented method of claim 1, wherein the application operates in the offline mode on the client device when the client device is not in communication with the processor and wherein the application operates in an online mode on the client device when the client device is in communication with the processor.

4. The computer-implemented method of claim 1, wherein retrieving the second event handler comprises:
   determining, by the processor, whether the second event handler exists in an event handler repository;
   generating, by the processor, the second event handler in response to the determination; and storing, by the processor, the second event handler in the event handler repository for future retrieval.

5. The computer-implemented method of claim 1, further comprising:
retrieving, by the processor, a preference of a user account logged into the client device, the preference specifying an extension field that is active on the business object.

6. The computer-implemented method of claim 5, wherein the metadata and second event handler are retrieved according to the extension field.

7. The computer-implemented method of claim 1, further comprising:
determining, by the processor, a time frame in which the application is scheduled to operate in the offline mode on the client device; and
retrieving, by the processor, the business object, metadata, and second event handler according to the time frame.

8. A non-transitory computer readable storage medium storing one or more programs to be executed by a processor, the one or more programs comprising instructions for:
receiving a client request to operate an application in an offline mode on a client device;
retrieving a business object from a business object repository, the business object containing application data to be utilized in the offline mode;
retrieving an event trigger for interacting with the business object, the event trigger pointing to a first event handler that is written in a first native programming language associated with the processor, the first event handler defining an action to perform on the business object;
determining a second native programming language of the client device;
retrieving a second event handler corresponding to the event trigger, the second event handler defining the action to perform on the business object, wherein the second event handler is written in the second native programming language;
modifying the event trigger to point to the second event handler instead of the first event handler; and
packaging the business object, the event trigger, and the second event handler.

9. The non-transitory computer readable storage medium of claim 8, wherein the client request includes an employee ID and wherein the business object and metadata are retrieved based on the employee ID.

10. The non-transitory computer readable storage medium of claim 8, wherein the application operates in the offline mode on the client device when the client device is not in communication with the processor and wherein the application operates in an online mode on the client device when the client device is in communication with the processor.

11. The non-transitory computer readable storage medium of claim 8, wherein retrieving the second event handler comprises:
determining whether the second event handler exists in an event handler repository;
generating the second event handler in response to the determination; and
storing the second event handler in the event handler repository for future retrieval.

12. The non-transitory computer readable storage medium of claim 8, further comprising:
retrieving a preference of a user account logged into the client device, the preference specifying an extension field that is active on the business object.

13. The non-transitory computer readable storage medium of claim 12, wherein the metadata and second event handler are retrieved according to the extension field.

14. The non-transitory computer readable storage medium of claim 8, further comprising:
determining a time frame in which the application is scheduled to operate in the offline mode on the client device; and
retrieving the business object, metadata, and second event handler according to the time frame.

15. A computer implemented system, comprising:
a processor; and
a non-transitory computer-readable storage medium comprising instructions, that when executed, control the processor to be configured for:
receiving a client request to operate an application in an offline mode on a client device;
retrieving a business object from a business object repository, the business object containing application data to be utilized in the offline mode;
retrieving an event trigger for interacting with the business object, the event trigger pointing to a first event handler that is written in a first native programming language associated with the processor, the first event handler defining an action to perform on the business object;
determining a second native programming language of the client device;
retrieving a second event handler corresponding to the event trigger, the second event handler defining the action to perform on the business object, wherein the second event handler is written in the second native programming language;
modifying the event trigger to point to the second event handler instead of the first event handler; and
packaging the business object, the event trigger, and the second event handler.

16. The computer implemented system of claim 15, wherein the application operates in the offline mode on the client device when the client device is not in communication with the processor and wherein the application operates in an online mode on the client device when the client device is in communication with the processor.

17. The computer implemented system of claim 15, wherein retrieving the second event handler comprises:
determining whether the second event handler exists in an event handler repository;
generating the second event handler in response to the determination; and
storing the second event handler in the event handler repository for future retrieval.

18. The computer implemented system of claim 15, further comprising:
retrieving a preference of a user account logged into the client device, the preference specifying an extension field that is active on the business object.

19. The computer implemented system of claim 18, wherein the metadata and second event handler are retrieved according to the extension field.

20. The computer implemented system of claim 15, further comprising:
determining a time frame in which the application is scheduled to operate in the offline mode on the client device; and
retrieving the business object, metadata, and second event handler according to the time frame.

* * * * *